(No Model.) 2 Sheets—Sheet 1.
A. D. LEWIS & C. S. IRISH.
CAN FOR MEASURING AND RETAILING LIQUIDS.
No. 420,645. Patented Feb. 4, 1890.
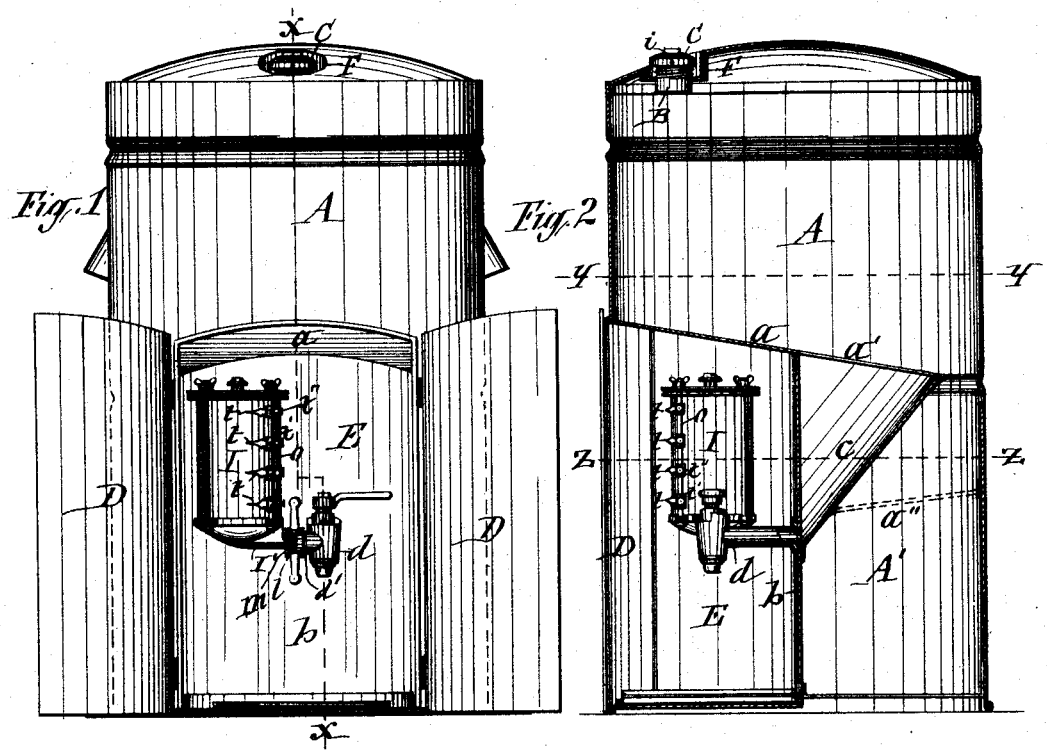
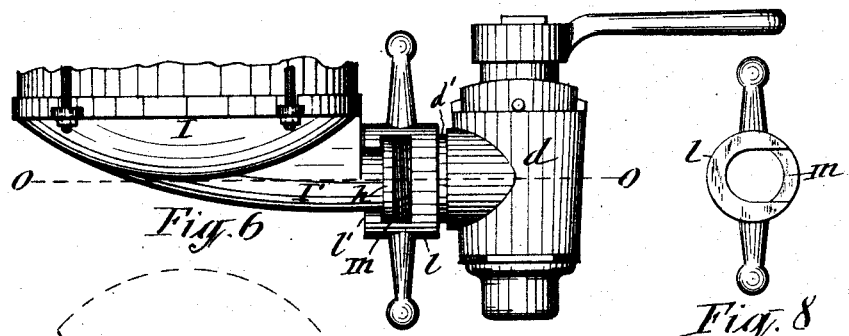
WITNESSES:
C. L. Bendixon
A. F. Walz
INVENTORS:
Alfred D. Lewis
Charles S. Irish
BY
Duell, Laass & Duell
ATTORNEYS (No Model.) 2 Sheets—Sheet 2.

A. D. LEWIS & C. S. IRISH.
CAN FOR MEASURING AND RETAILING LIQUIDS.

No. 420,645. Patented Feb. 4, 1890.

WITNESSES:
C. L. Bendixon
A. F. Walz

INVENTORS:
Alfred D. Lewis
Charles S. Irish
BY
Dudly, Laass & Dudl
ATTORNEYS

United States Patent Office.

ALFRED D. LEWIS AND CHARLES S. IRISH, OF JORDAN, NEW YORK, ASSIGNORS TO THE PERFECT LIQUID MEASURE MANUFACTURING COMPANY, OF SAME PLACE.

CAN FOR MEASURING AND RETAILING LIQUIDS.

SPECIFICATION forming part of Letters Patent No. 420,645, dated February 4, 1890.

Application filed September 5, 1889. Serial No. 323,023. (No model.)

*To all whom it may concern:*

Be it known that we, ALFRED D. LEWIS and CHARLES S. IRISH, of Jordan, in the county of Onondaga, in the State of New York, have invented new and useful Improvements in Self-Measuring Liquid-Cans, of which the following, taken in connection with the accompanying drawings, is a full, clear, and exact description.

This invention consists, chiefly, in a novel construction of a liquid tank or can having underneath it a cabinet which incloses the faucet and the necessary appliances for drawing the liquid in measured quantities from the said tank or can; and the invention also consists in certain novel features of the details of the aforesaid tank and devices connected therewith, as hereinafter more fully described, and specifically set forth in the claims.

Figure 3:
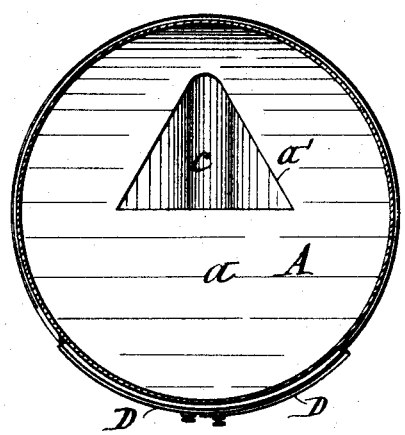
Figure 4:
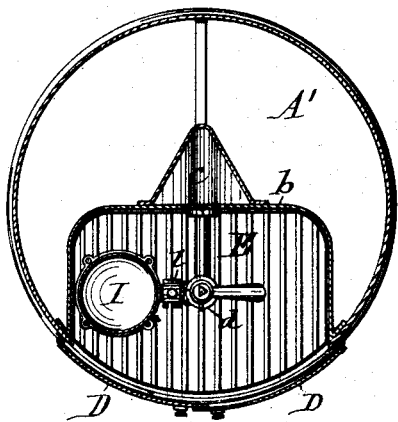
Figure 5:
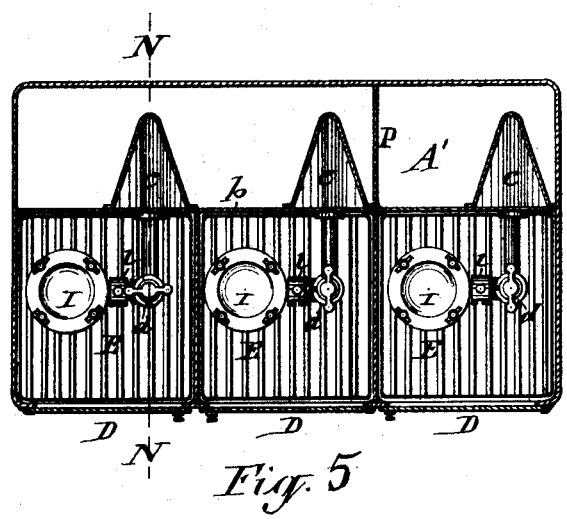
Figure 9:
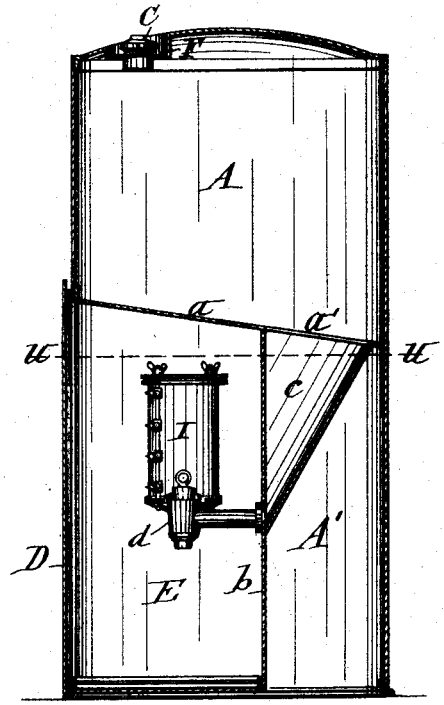

In the annexed drawings, Figure 1 is a front elevation of a self-measure liquid-can embodying our improvements. Fig. 2 is a vertical transverse section on line $x$ $x$, Fig. 1. Figs. 3 and 4 are horizontal transverse sections, respectively, on lines $y$ $y$ and $z$ $z$, Fig. 2. Fig. 5 is a horizontal transverse section on line U U, Fig. 9. Fig. 6 is an enlarged side view of the coupling which connects the measure to the two-way faucet. Fig. 7 is a horizontal transverse section on line O O, Fig. 6. Fig. 8 is a detached plan view of the coupling-nut. Fig. 9 is a vertical transverse section on line N N. Figs. 5 and 9 illustrate a modification of our invention.

Similar letters of reference indicate corresponding parts.

A represents the tank containing the oil or other liquid to be drawn therefrom in measured quantities. Said tank is preferably formed of suitable sheet metal, and may be of any desired shape in cross-section, though preferably of cylindrical form. $a$ denotes the bottom of said tank. This bottom is inclined from the front to the rear side of the tank, as shown in Figs. 1, 2, and 9 of the drawings. Under the said tank we arrange a cabinet E, and preferably attach it thereto permanently by forming the vertical wall of the tank with a downward extension A', which serves to support the tank a proper elevation above the floor. The lower side of the bottom $a$ we tap by a suitable duct $c$, to which we attach the faucet $d$. In order to simplify the construction and at the same time brace the central portion of the bottom $a$, and also obviate the danger of the duct $c$ becoming clogged, we erect under the said bottom a supporting-wall $b$, and cut in the lower portion of the bottom $a$ a large opening $a'$, which is back of the wall $b$. If desired to enlarge the capacity of the tank, the portion of the bottom $a$ back of the wall $b$ may be placed in a lower plane than the main portion of the bottom, as indicated by dotted lines $a''$ in Fig. 2.

From the under side of the bottom $a$ to the back of the wall $b$ we extend an inclined trough-shaped plate, which surrounds with its upper edge the opening $a'$ and is secured air-tight to both the aforesaid bottom and wall $b$. The compartment E in front of the wall $b$ constitutes the cabinet, in which we locate the faucet $d$, which taps the lower end of the duct $c$ and is firmly secured thereat to the wall $b$, said cabinet being provided with a door D in front of the faucet, so that the latter may be completely inclosed when desired.

To render the apparatus self-measuring we employ a two-way faucet $d$, similar to that shown in our prior patent, No. 348,564, dated September 7, 1886, said faucet having a lateral branch $d'$, to which is connected the measure I. The spigot of the faucet is provided with a horizontal channel $n$, extending about one-fourth around one side thereof, and with a vertical channel $n'$, extending down through its center and terminating with a lateral channel $n''$, extending through its side, as shown in Fig. 7 of the drawings, the channels $n$ and $n''$ being in such position in relation to the barrel of the faucet and branch $d'$ that by turning the spigot into the position shown the liquid is allowed to run from the tank A to the measure I, and then by giving the spigot a quarter-turn toward the measure the communication between the measure and tank is cut off and the liquid allowed to run from the measure through the channels $n'\,n''$ to a receptacle placed under the faucet.

In order to facilitate the attachment and detachment of the measure I when desired, we prefer to employ a union, in which the coupling-nut $l$, which engages the screw-threaded branch $d'$, is formed with a smooth-bored extension terminating with an inward flange $l''$, by which it engages the collar $h$ on the pipe I′, which is formed on the bottom of the measure I, as shown in Figs. 6 and 7 of the drawings. The aforesaid extension of the coupling-nut we form with an opening $m$ in its side of a size to allow the collar $h$ and adjacent portion of the pipe I′ to pass laterally through it, which latter can be effected after the coupling-nut is loosened.

The measure I is composed either partly or wholly of glass to render the contents of the measure visible from the exterior. To a vertical rod $o$ on the exterior of the measure we attach the indicators $t\,t$, which are set to indicate the measures of liquid contained in the can at different elevations thereof. In order to allow the said indicators to be adjusted to accurately perform their aforesaid functions, we connect them to the rod $o$, adjustable vertically, preferably by forming each indicator with a sleeve $t'$, through which the rod $o$ passes, and a set-screw $t''$ is inserted in a screw-threaded eye in the sleeve and engages by its end the side of the rod $o$. By loosening the set-screw the indicator can be moved up or down on the rod to bring it to its requisite position, in which it is then secured by tightening the set-screw.

The top of the tank A we form with a recess F and in an opening in the center of said recess we secure the bung B.

We do not limit ourselves to the arrangement of a single cabinet under the tank, inasmuch as in some cases it may be desirable to connect to the tank two or more faucets having measures I of different capacity, and to inclose each faucet with its measure in a separate cabinet, as shown in Fig. 5 of the drawings. Furthermore, the tank may be rectangular in cross-section and a partition P extended across the same to form compartments for different liquids, each of said compartments having underneath it a cabinet E inclosing the faucet which taps the compartment, as shown in Figs. 9 and 10 of the drawings.

In each case the cabinet or downward extension of the wall of the tank is provided with a suitable door D in front of the faucet or opposite the wall $b$.

What we claim as new, and desire to secure by Letters Patent, is—

1. The combination of the tank A, formed with the downward extension A′, the bottom $a$ between said tank and its extension and provided with the opening $a'$, the wall $b$ under the bottom in front of the said opening, the cabinet $e$ in front of said wall, a trough-shaped plate extending from the opening $a'$ to the aforesaid wall, and the faucet secured to the wall $b$ at the lower end of the trough-shaped plate, substantially as described and shown.

2. The combination of the tank A, having its bottom $a$ inclined to one side of the tank and its body extending beneath the said bottom, the wall $b$ in the body-extension supporting the central portion of the bottom, the duct $c$, extending from the bottom $a$ to the wall $b$, the faucet $d$, attached to said wall at the base of the duct, and the door D in the body-extension in front of the faucet, substantially as described and shown.

In testimony whereof we have hereunto signed our names this 3d day of September, 1889.

ALFRED D. LEWIS. [L. S.]
CHARLES S. IRISH. [L. S.]

Witnesses:
ROBT. E. GREENE,
A. E. BRACE.